United States Patent Office 3,449,203
Patented June 10, 1969

3,449,203
HIGH EXPANSION SEALING GLASS AND COMPOSITE ARTICLE
Hellmuth G. Fischer, Toledo, Ohio, assignor to Owens-Illinois, Inc., a corporation of Ohio
No Drawing. Filed Aug. 24, 1966, Ser. No. 574,543
Int. Cl. B32b 17/06, 15/20; C03c 3/04
U.S. Cl. 161—196                         11 Claims The prevent invention relates to novel glass compositions. More particularly, the instant invention pertains to novel glass compositions possessing a high coefficient of thermal expansion and improved chemically durability against aqueous media. In another aspect, the invention relates to vitreous sealing glasses for effecting glass-to-metal seals or glass-to-glass seals.

A critical need exists for sealing glass with a high coefficient of thermal expansion for bonding preformed parts, wherein said assembled parts consist of glass-to-glass and glass-to-metal; such metal including copper or copper containing alloys. Historically, the alkali oxides, especially sodium oxide and potassium oxide, are employed to increase the coefficient of thermal expansion of glasses; however, as the concentration of these alkali oxides is increased, there is an accompanying tendency towards devitrification and a decrease in the chemical durability of the glass against aqueous attack. Attempts have been made by the prior art to avoid the high tendency toward devitrification associated with the increased alkali concentration by the use of alumina and calcium oxide, but these attempts have not led to satisfactory results. Likewise, the employment of the oxides of magnesium, zinc, and barium have been unsatisfactory as the tendency towards devitrification occurs during the working and forming stages of the glass. It will be appreciated by those versed in the art that if a glass composition can be formulated possessing a high coefficient of thermal expansion and with a decreased tendency towards devitrification, said glass would represent a substantial contribution to the art. Likewise, it will be further appreciated by those skilled in the art that a glass with good sealing properties for copper or copper alloys, and with good working properties would have a positive commercial value and would also increase the usefulness of said glass.

Accordingly, it is an object of the present invention to provide novel glass compositions.

It is a further object of this invention to provide glass compositions having a high coefficient of thermal expansion.

Yet a further object of this invention is to provide glass compositions for sealing glass-to-copper and copper alloys.

A still further object of this invention is to provide glass compositions with an improved resistance against aqueous attack and a decreased degree of devitrification.

Yet a still further object of the present invention is to provide a glass composition with a higher softening point.

These and other objects of this invention will become apparent from the following detailed description and claims.

In attaining the objects and features of the present invention, it has now been discovered that glass compositions with a linear coefficient of thermal expansion of about 150 to $180 \times 10^{-7}/°$ C. (0–300° C.) can be made by intimately blending silica, fluorine, zirconium, the oxides of magnesium, zinc and barium, the alkali oxides and other glass forming ingredients in inventive amounts. The glass compositions of the instant invention contain the following components: 40 to 50 weight percent $SiO_2$, 3 to 9 weight percent MgO, 2 to 7 weight percent BaO, about 0 to 5 weight percent $ZrO_2$, about 3 to 8 weight percent $Al_2O_3$, about 2 to 7 weight percent ZnO, about 0 to 2 weight percent CaO, about 25 to 28 weight percent $Na_2O$, about 5 to 9 weight percent $K_2O$, about 0 to 4 weight percent $B_2O_3$, and about 1.5 to 5.5 weight percent fluoride.

A now preferred group of glasses for sealing to copper and metals of similar high expansion comprises glasses having a coefficient of thermal expansion (0–300° C.) from 150 to $180 \times 10^{-7}/°$ C. and which contain 40 to 45 weight percent $SiO_2$, 4 to 6 weight percent MgO, 2 to 3 weight percent BaO, 1 to 2 weight percent $ZrO_2$, 0.1 to 1 weight percent CaO, 4 to 5 weight percent $Al_2O_3$, 2 to 4 weight percent ZnO, 7 to 8 weight percent $K_2O$, 25 to 28 weight percent $Na_2O$, 1 to 2 weight percent $B_2O_3$, and 2 to 3 weight percent $F_2$, a total of 44 to 50 weight percent $SiO_2+Al_2O_3$, a $Na_2O$ to $K_2O$ ratio of 1:1 to 6:1 and a total of 8 to 12 weight percent $Al_2O_3+ZnO+BaO$. Exemplary of other glass compositions are a glass consisting essentially of 42 to 44 weight percent $SiO_2$, 5 to 6 weight percent MgO, 2 to 3 weight percent BaO, 1 to 2 weight percent $ZrO_2$, 4 to 5 weight percent $Al_2O_3$, 3 to 4 weight percent ZnO, 0.1 to 0.5 weight percent CaO, 7 to 8 weight percent $K_2O$, 26 to 27 weight percent $Na_2O$, 1 to 2 weight percent $B_2O_3$ and 2 to 3 weight percent fluorine; and a glass consisting essentially of 42 to 44 weight percent $SiO_2$, 5 to 6 weight percent MgO, 2 to 3 weight percent BaO, 5 to 7 weight percent $ZrO_2$, 3 to 4 weight percent ZnO, 0.1 to 0.5 weight percent CaO, 7 to 8 weight percent $K_2O$, 26 to 27 weight percent $Na_2O$, 1 to 2 weight percent $B_2O_3$ and 2 to 3 weight percent fluorine.

In the above disclosed glass compositions, the addition of fluorine-containing compounds, for example alkali fluoride, alkali silico-fluoride, sodium fluoride, aluminum fluoride, cryolite, fluorspar and the like resulting in amounts up to 5.5 weight percent of fluorine has been found to unexpectedly make possible the employment of increased limits of alumina and the oxides of magnesium, zinc and barium without causing an increased tendency toward uncontrolled devitrification. The presence of fluorine in the glass composition, in addition, makes possible an alkali oxide, $Na_2O$ and $K_2O$, concentration of about 33 to 38 weight percent with a ratio of $Na_2O$ to $K_2O$ of from 1:1 to 6:1 without producing devitrification.

The chemical durability or resistance of the novel glasses of the invention against water is further improved and the softening point is raised by the addition of zirconium oxide in weight percent ranges of up to 5%. The presence of zirconium oxide in the glass was unexpectedly made without causing a tendency toward devitrification, and the glass could be formed and reheated in a blast flame without any visible evidence of the above tendency.

The above and following description and examples are merely representative of the mode and manner of the invention and are not to be construed as limiting the invention, as these and other methods will be obvious from the instant disclosure to those skilled in the art.

EXAMPLE 1

A novel glass composition was prepared from the following batch components:

| Components— | Weight in grams |
|---|---|
| Sand | 44.5 |
| Magnesium oxide | 6 |
| Barium carbonate | 3.8 |
| Zirconium oxide | 1.5 |
| Aluminum hydroxide | 5.9 |
| Zinc oxide | 3.5 |
| Fluorspar | 0.35 |
| Soda ash | 43.6 |
| Sodium fluoride | 0.4 |
| Potash | 12.3 |
| Boric acid | 3.5 |
| Cryolite | 4.5 |
| Sodium nitrate | 0.6 |
| Sodium sulfate (anhydrous) | 0.3 |
| Arsenic ($As_2O_3$) | 0.1 |
| Sodium selenite | 0.002 |

The above batch materials were intimately blended and melted in a 90% platinum-10% rhodium crucible for 3 to 5 hours, at 1300 to 1350° C. and in an air atmosphere. The melting was carried out in an electrically heated furnace, although, other heat sources can be successfully employed.

The novel glass prepared from the above melt had the following weight percent composition:

| Components— | Weight percent |
|---|---|
| $SiO_2$ | 42.6 |
| MgO | 5.74 |
| BaO | 2.84 |
| $ZrO_2$ | 1.44 |
| $Al_2O_3$ | 4.71 |
| ZnO | 3.30 |
| CaO | 0.24 |
| $K_2O$ | 7.90 |
| $Na_2O$ | 26.71 |
| $B_2O_3$ | 1.89 |
| $F_2$ | 2.58 |

This glass has a coefficient of thermal expansion of about $175 \times 10^{-7}/°$ C. between 20 and 400° C. and a softening point of about 510° C.

The chemical resistance for the above glass was measured by the standard grain test, and compared against similar glass compositions for resistance against water attack. The conventional standard grain test consists essentially of crushing a ten gram sample of the glass to be tested into a particle size of about 0.3 to 0.5 mm. diameter, placing the grains of glass thus obtained in a chemically resistant flask equipped with a reflux condenser and refluxing the grains of glass in 100 ml. of distilled water for 4 hours at boiling temperature. The quantity of dissolved substance is then determined by vaporizing a measured quantity of the employed water, drying the residue in an oven and weighing the resulting product. The result obtained for the glass of Example 1 was 200 mg. The results for two glass compositions essentially free of fluorine and zirconium and consisting essentially of, expressed in weight percent, 44.25% $SiO_2$, 6.0% MgO, 3.0% BaO, 5.0% $Al_2O_3$, 3.5% ZnO, 0.25% CaO, 8.5% $K_2O$, 27.5% $Na_2O$, and 2.0% $B_2O_3$, and a glass consisting essentially of 43.9% $SiO_2$, 5.95% MgO, 2.9% BaO, 4.96% $Al_2O_3$, 3.5% ZnO, 0.25% CaO, 8.4% $K_2O$, 28.1% $Na_2O$, and 1.98% $B_2O_3$ were respectively 734 and 1167 mgs. The unobvious and unexpected increased chemical durability for the novel subject glasses appears to be demonstrated by a decreased loss of weight by addition of fluorine and zirconium to the subject glasses.

EXAMPLE 2

| Components— | Weight in grams |
|---|---|
| Sand (99.8% $SiO_2$) | 2225 |
| Magnesium oxide | 300 |
| Barium carbonate | 190 |
| Aluminum hydroxide (65.4% $Al_2O_3$) | 471 |
| Zinc oxide | 175 |
| Calcium fluoride | 18 |
| Sodium carbonate | 2180 |
| Sodium fluoride | 155 |
| Potassum carbonate | 615 |
| Boric acid | 175 |
| Aluminum fluoride | 90 |
| Sodium nitrate | 30 |
| Sodium sulphate (anhydrous) | 15 |
| Arsenic ($As_2O_3$) | 5 |

The above-listed batch components were intimately blended to obtain a substantially homogeneous mixture and then the mixture was melted in a 90% platinum-10% rhodium crucible in an electrically heated furnace for 2 hours and 20 minutes at 2380 to 2470° F., and in an air atmosphere.

The novel glass prepared from the above melt had the following theoretically calculated composition:

| Components— | Weight percent |
|---|---|
| $SiO_2$ | 42.6 |
| MgO | 5.74 |
| BaO | 2.85 |
| $Al_2O_3$ | 6.15 |
| ZnO | 3.30 |
| CaO | 0.24 |
| $K_2O$ | 7.90 |
| $Na_2O$ | 26.71 |
| $B_2O_3$ | 1.89 |
| $F_2$ | 2.58 |

The glass had a coefficient of expansion of $153 \times 10^{-7}$ (0–300° C.), an annealed density of 2.6364, a softening point temperature of 502° C., and an annealing point of 374° C.

EXAMPLE 3

A novel sealing glass composition similar to the glass composition set forth in Example 2, wherein the instant glass contained both fluorine and zirconium, was prepared from the following batch ingredients:

| Ingredients— | Weight in grams |
|---|---|
| Sand (Ottawa, 99.8% $SiO_2$) | 2185 |
| Zircon (66% $ZrO_2$-33.5% $SiO_2$) | 115 |
| Magnesium oxide | 300 |
| Barium carbonate | 190 |
| Aluminum hydroxide (65.4% $Al_2O_3$) | 361 |
| Zinc oxide | 175 |
| Calcium fluoride | 18 |
| Sodium carbonate | 2180 |
| Sodium fluoride | 155 |
| Potassium carbonate | 615 |
| Boric acid | 175 |
| Aluminum fluoride | 90 |
| Sodium nitrate | 30 |
| Sodium sulphate (anhydrous) | 15 |
| Arsenic ($As_2O_3$) | 5 |

The above ingredients were thoroughly mixed to obtain a well-blended homogeneous mixture and the mixture was melted in a 90% platinum-10% rhodium crucible in an electrically heated furnace at 2380 to 2450° F., for 2 hours and 45 minutes, and in an air atmosphere.

The novel glass prepared from the above melt had the following theoretically calculated composition:

| Oxide— | Weight percent |
|---|---|
| $SiO_2$ | 42.65 |
| $ZrO_2$ | 1.44 |
| MgO | 5.74 |
| BaO | 2.84 |
| $Al_2O_3$ | 4.71 |
| ZnO | 3.30 |
| CaO | 0.24 |
| $K_2O$ | 7.90 |
| $Na_2O$ | 26.71 |
| $B_2O_3$ | 1.89 |
| $F_2$ | 2.58 |

The glass thus prepared possessed the following physical characteristics: a coefficient of thermal expansion of $151.9 \times 10^{-7}$ (0–300° C.), an annealing point of 370° C., a strain point of 354° C., and an unannealed density of 2.6697.

The glass compositions of Example 2 and Example 3 were tested for their resistance against aqueous attack by a standard powdered glass test. In this test, glass samples were crushed in a mortar to a fine grain size. The grains which pass through a No. 40 sieve (420 micron) and retained on a No. 50 sieve (297 micron) were used for test purposes. The crushed grains were exposed to 50 ml. of distilled water at 121° C. for 30 minutes in a conventional autoclave. The resulting extract solution was titrated to the methyl red end point with 0.02 N $H_2SO_4$, and the volume of acid used for titration was recorded. The results obtained for two glasses prepared according to Example 2, that were essentially-free of zirconium, were 251.0 and 250.7 ml. of 0.02 $H_2SO_4$. The results obtained for two glass compositions, prepared according to Example 3 that contained zirconium and fluorine, were 221.2 and 225.3 ml. of 0.02 N $H_2SO_4$. This test data is seen to illustrate the unexpected and improved chemical durability against aqueous attack for the subject glasses.

The glass compositions of the instant invention can be used as vitreous sealing glasses for assembling preformed parts. That is, the vitreous sealing glasses can be used for effecting seals, such as glass-to-glass, glass-to-metal or the like. The sealing glasses can be applied by both the conventional hot or cold techniques. If the cold procedure is utilized, the sealing glass is ground and mixed with a suitable carrier or vehicle to form a paste-like mixture. One acceptable vehicle is composed of about 1 to 3%, usually about 1 to 2% nitrocellulose in amyl acetate. Other acceptable organic binders or vehicles can be employed provided they will not adversely affect the sealing glass and provided they readily burn off and violatize during the heating procedure of the sealing of the preformed parts. As an example of other organic binders that can be used are gelatine dissolved in water, nitrocellulose and butyl acetate, camphor with cellulose and the like.

The vitreous sealing glass can be applied by using art accepted techniques, such as spatula, extrusion, cold dip, brush, doctor blade or any like means. The sealing glass can also be used in bead form and the sealing carried out in a gas-oxygen flame or any suitable flame. Alternatively, at least one of the surfaces to be sealed can be coated with the sealing glasses, the parts assembled, dried and sealed in an oven, and finally cooled to room temperature.

A vitreous sealing glass consisting essentially of 42.6 weight percent $SiO_2$, 5.74 weight percent MgO, 2.84 weight percent BaO, 2.84 weight percent $Al_2O_3$, 3.30 weight percent ZnO, 0.24 weight percent CaO, 7.90 weight percent $K_2O$, 26.71 weight percent $Na_2O$, 1.89 weight percent $B_2O_3$ and 2.58 weight percent $F_2$ was drawn into a cane of about 3/16 inch diameter and bead sealed to a piece of copper. The stress for this seal was 2100 p.s.i. compression. A second bead seal with a compression of 1200 p.s.i. was effected by sealing a composition consisting essentially of 42.65 weight percent $SiO_2$, 1.44 weight percent $ZrO_2$, 5.74 weight percent MgO, 2.84 weight percent BaO, 4.71 weight percent $Al_2O_3$, 3.30 weight percent ZnO, 0.24 weight percent CaO, 7.90 weight percent $K_2O$, 26.71 weight percent $Na_2O$, 1.89 weight percent $B_2O_3$, 2.58 weight percent $F_2$ to a given length of copper. Samples of the composition described in Example 1 were sealed to copper, either in the form of wires or to plates where the glass was glazed to the plate surface and these seals were kept under observation for a period of several months with no apparent visible evidence of cracking or other kinds of deterioration observed.

The glass compositions of the present invention have a high thermal coefficient of expansion and are therefore of import to commerce and science. The sealing glasses can be used for sealing copper wires into glass surfaces as required in the manufacture of electronic components, such as diodes and the like. The glasses of the instant invention can also be used for insulating copper coils, for example, coils in transformers, voltage regulators and the like.

As generally understood by those versed in the art glasses are commonly analyzed for the metals, and the composition is reported on the basis of the theoretically calculated normal oxide of each cation so analyzed. However, when fluorine is present, it is actually present as a fluoride of one or more of the cations in the glass or similarly bound in the glass structure, but it is analyzed separately and reported as fluorine. Actually, of course, the fluorine replaces part of the oxygen in the oxides of the composition. Hence, although the sealing glasses of present invention contain cations which may be present in the glasses as oxides and or fluorides, such cations are expressed on a theoretically calculated oxide basis in weight percent. Of course it should be understood that the amount of combined oxygen actually present in the glass is less than that so expressed in the foregoing oxide basis by an amount chemically equivalent to the fluorine present in the glass.

I claim:

1. A vitreous sealing glass composition wherein said composition consists essentially of 40 to 50 weight percent $SiO_2$, 3 to 9 weight percent MgO, 2 to 7 weight percent BaO, 0 to 5 weight percent $ZrO_2$, 3 to 8 weight percent $Al_2O_3$, 2 to 7 weight percent ZnO, 0 to 2 weight percent CaO, 25 to 28 weight percent $Na_2O$, 5 to 9 weight percent $K_2O$, 0 to 4 weight percent $B_2O_3$, and 1.5 to 5.5 weight percent $F_2$.

2. The glass composition according to claim 1 wherein the concentration of $Na_2O$ plus $K_2O$ is 33 to 38 weight percent.

3. The glass composition according to claim 1 wherein the ratio of $Na_2O$ to $K_2O$ is 1:1 to 6:1.

4. The glass composition according to claim 1 wherein said glass consists essentially of 42 to 44 weight percent $SiO_2$, 5 to 6 weight percent MgO, 2 to 3 weight percent BaO, 1 to 2 weight percent $ZrO_2$, 4 to 5 weight percent $Al_2O_3$, 3 to 4 weight percent ZnO, 0.1 to 0.5 weight percent CaO, 7 to 8 weight percent $K_2O$, 26 to 27 weight percent $Na_2O$, 1 to 2 weight percent $B_2O_3$ and 2 to 3 weight percent $F_2$.

5. The glass composition according to claim 1 wherein said glass consists essentially of 42 to 44 weight percent $SiO_2$, 4 to 6 weight percent MgO, 2 to 3 weight percent BaO, 1 to 2 weight percent $ZrO_2$, 0 to 1 weight percent CaO, 4 to 5 weight percent $Al_2O_3$, 2 to 4 weight percent ZnO, 7 to 8 weight percent $K_2O$, 25 to 28 weight percent $Na_2O$, 1 to 2 weight percent $B_2O_3$, and 2 to 3 weight percent $F_2$.

6. The glass composition according to claim 1 wherein said glass has a total of 8 to 24 weight percent $MgO+Al_2O_3+ZnO$, and a total of 7 to 22 weight percent $Al_2O_3+ZnO+BaO$.

7. A glass composition according to claim 1 wherein said glass consists essentially of 40 to 50 weight percent $SiO_2$, 4 to 6 weight percent MgO, 2 to 3 weight percent BaO, 1 to 2 weight percent $ZrO_2$, 0 to 1 weight percent CaO, 4 to 5 weight percent $Al_2O_3$, 2 to 4 weight percent ZnO, 7 to 8 weight percent $K_2O$, 25 to 28 weight percent $Na_2O$, 1 to 2 weight percent $B_2O_3$, and 2 to 3 weight $F_2$.

8. The glass according to claim 7 wherein said glass has a total of 44 to 55 weight percent $SiO_2+Al_2O_3$, and a total of 8 to 12 weight percent $Al_2O_3+ZnO+BaO$, and a total of 10 to 15 weight percent $MgO+Al_2O_3+ZnO$.

9. The glass composition according to claim 1 wherein said glass consists essentially of 42.6 weight percent $SiO_2$, 5.7 weight percent MgO, 2.8 weight percent BaO, 1.4 weight percent $ZrO_2$, 4.7 weight percent $Al_2O_3$, 3.3 weight percent ZnO, 0.2 weight percent CaO, 7.9 weight percent $K_2O$, 26.7 weight percent $Na_2O$, 1.9 weight percent $B_2O_3$, and 2.6 weight percent $F_2$.

10. A composite article comprising preformed parts, at least one of which parts is a metal and a layer of a vitreous sealing glass between said parts and integrally bonded thereto and wherein said solder glass consist essentially of 40 to 45 weight percent $SiO_2$, 4 to 6 weight percent MgO, 2 to 3 weight percent BaO, 1 to 2 weight percent $ZrO_2$, 4 to 5 weight percent $Al_2O_3$, 2 to 4 weight percent ZnO, 0.1 to 0.5 weight percent CaO, 25 to 28 weight percent $Na_2O$, 7 to 8 weight percent $K_2O$, 2 to 3 weight percent $F_2$ and 1 to 2 weight percent $B_2O_3$.

11. An article according to claim 10 wherein said metal is copper.

References Cited

UNITED STATES PATENTS

| | | | |
|---|---|---|---|
| 2,844,693 | 7/1958 | Rigterink | 106—48 XR |
| 2,929,727 | 3/1960 | Oldfield et al. | 106—52 |
| 2,933,458 | 4/1960 | King et al. | 106—52 |
| 3,240,661 | 3/1966 | Babcock | 161—196 |

HELEN M. McCARTHY, *Primary Examiner.*

U.S. Cl. X.R.

106—48, 52, 54

UNITED STATES PATENT OFFICE
CERTIFICATE OF CORRECTION

Patent No. 3,449,203                            June 10, 1969

Hellmuth G. Fischer

It is certified that error appears in the above identified patent and that said Letters Patent are hereby corrected as shown below:

Column 1, line 10, "prevent" should read -- present --. Column 3, line 18, "Cryolite" should read -- Cryolithe --. Column 6, line 63, "4" should read -- 5 --; line 64, "1 to 2 weight percent $ZrO_2$" should be canceled; line 64 "0" should read -- 0.1 --; line 64, "1" should read -- 0.5 --; line 65, "4", first occurrence, should read -- 5 --; line 65, "5" should read -- 7 --; line 65, "2" should read -- 3 --; line 66, "25" should read -- 26 --; line 66, "28" should read -- 27 --. Column 7, line 19, "consist" should read -- consists --.

Signed and sealed this 2nd day of June 1970.

(SEAL)
Attest:

Edward M. Fletcher, Jr.                         WILLIAM E. SCHUYLER, JR.
Attesting Officer                               Commissioner of Patents